(12) United States Patent
Bartel

(10) Patent No.: US 7,568,546 B2
(45) Date of Patent: Aug. 4, 2009

(54) LOW LOAD FLOOR MOTOR VEHICLE

(75) Inventor: James J. Bartel, Commerce Township, MI (US)

(73) Assignee: Diamond Force Engineering LLC, Warrenville, IL (US)

( * ) Notice: Subject to any disclaimer, the term of this patent is extended or adjusted under 35 U.S.C. 154(b) by 0 days.

(21) Appl. No.: 11/763,293

(22) Filed: Jun. 14, 2007

(65) Prior Publication Data

US 2007/0227800 A1    Oct. 4, 2007

Related U.S. Application Data

(62) Division of application No. 10/751,859, filed on Jan. 6, 2004, now Pat. No. 7,232,004, which is a division of application No. 09/710,720, filed on Nov. 9, 2000, now Pat. No. 6,702,057.

(51) Int. Cl.
*B60K 5/02* (2006.01)

(52) U.S. Cl. ........................................ 180/292; 180/374

(58) Field of Classification Search ................. 180/291, 180/292, 374, 376, 378, 379, 380, 383, 385; 280/781, 788, 124.125, 124.128, 124.156; 74/413

See application file for complete search history.

(56) References Cited

U.S. PATENT DOCUMENTS

| | | | |
|---|---|---|---|
| 2,151,633 A | 3/1939 | Black | |
| 2,527,487 A | 10/1950 | Paton | |
| 3,011,578 A | 12/1961 | DeLorean | |
| 3,633,775 A | 1/1972 | Pugliese | |
| 3,666,036 A | 5/1972 | Scerbo | |
| 3,787,073 A | 1/1974 | Lievore | |
| 3,901,096 A | 8/1975 | Woody | |
| 3,951,225 A | 4/1976 | Schwenk | |
| 4,039,037 A | 8/1977 | Vin | |
| 4,064,956 A | 12/1977 | Wildey | |
| 4,180,138 A | 12/1979 | Shea | |
| 4,205,729 A | 6/1980 | Morino | |
| 4,220,349 A | 9/1980 | Gaussin | |
| 4,260,315 A | 4/1981 | Bouffard | |
| 4,312,244 A * | 1/1982 | Barnes et al. | .................. 74/410 |

(Continued)

FOREIGN PATENT DOCUMENTS

CH    392284    9/2007

(Continued)

*Primary Examiner*—Frank B Vanaman
(74) *Attorney, Agent, or Firm*—Harness, Dickey & Pierce, P.L.C.

(57) ABSTRACT

A step-down power transfer device for providing a dropped drive line in a front engine and rear drive vehicle. The step-down power transfer device is preferably chain or gear driven. A preferred vehicle a includes a power train having a longitudinally mounted front engine, a step-down power transfer device, a single segment drive shaft, a half-shaft differential, swing axles and geared reduction wheel end drives. The vehicle can have an exceptionally low, i.e., 16 to 18 inches, load floor that is flat at least between the step-down power transfer device and the differential. The resultant vehicle has many parts in common with popular traditional front engine/rear drive trucks. Combining the power train described above with a low profile rear suspension provides added low load floor benefits.

4 Claims, 9 Drawing Sheets

U.S. PATENT DOCUMENTS

| | | |
|---|---|---|
| 4,353,429 A | 10/1982 | Herron |
| 4,355,696 A | 10/1982 | Moll |
| 4,453,735 A | 6/1984 | Penverne et al. |
| 4,513,834 A | 4/1985 | Hayashi et al. |
| 4,568,094 A | 2/1986 | Lovell |
| 4,662,467 A | 5/1987 | Arai et al. |
| 4,669,571 A * | 6/1987 | Kurde ........................ 180/348 |
| 4,690,238 A | 9/1987 | von Sivers et al. |
| 4,705,128 A | 11/1987 | Krude |
| 4,709,778 A | 12/1987 | von Sivers |
| 4,723,790 A | 2/1988 | Wharton |
| 4,878,691 A | 11/1989 | Cooper et al. |
| 4,934,733 A | 6/1990 | Smith et al. |
| 4,946,333 A | 8/1990 | Boatwright |
| 5,012,885 A | 5/1991 | Hilden |
| 5,016,912 A | 5/1991 | Smith et al. |
| 5,040,826 A | 8/1991 | Lovell |
| 5,099,943 A | 3/1992 | Resca et al. |
| 5,215,329 A | 6/1993 | Santo |
| 5,275,430 A | 1/1994 | Smith |
| 5,469,931 A | 11/1995 | Kawata et al. |
| 5,609,219 A | 3/1997 | Watson et al. |
| 5,810,544 A | 9/1998 | Wellman |
| 5,863,070 A | 1/1999 | Williams et al. |
| 5,868,418 A | 2/1999 | VanDenberg |
| 5,887,880 A | 3/1999 | Mullican et al. |
| 5,907,973 A | 6/1999 | Van Wonterghem |
| 5,954,352 A | 9/1999 | Rumpel et al. |
| 6,035,956 A | 3/2000 | Maurer et al. |
| 6,039,351 A | 3/2000 | Jones et al. |
| 6,142,496 A | 11/2000 | Bartel |
| 6,205,877 B1 | 3/2001 | Vilain |
| 6,345,680 B1 | 2/2002 | Hill |
| 6,394,215 B1 | 5/2002 | Masuda |

FOREIGN PATENT DOCUMENTS

| | | |
|---|---|---|
| EP | 0464412 A1 | 6/1991 |
| EP | 464412 A | 1/1992 |
| GB | 2322604 | 9/1998 |
| LU | 71578 | 1/1975 |
| LU | D36111 | 6/1995 |
| WO | 0238417 | 5/2002 |
| WO | 0238417 A3 | 5/2002 |

* cited by examiner

LOW LOAD FLOOR MOTOR VEHICLE

CROSS REFERENCE TO RELATED APPLICATIONS

This application is a divisional of U.S. patent application Ser. No. 10/751,859, filed on Jan. 6, 2004, which is a divisional of U.S. patent application Ser. No. 09/710,720 filed on Nov. 9, 2000 now U.S. Pat. No. 6,702,057. The disclosures of the above applications are incorporated herein by reference.

FIELD

This invention relates to a low load floor motor vehicle and more particularly a low load floor vehicle that has a longitudinally mounted front engine and a rear wheel drive. This low load floor vehicle has special application as a medium duty bus and delivery truck.

BACKGROUND

The advantages of having a passenger or cargo vehicle with a flat load floor are well known. Heavy-duty trucks usually have longitudinally mounted front engines and rear drives. A flat load floor is obtained with such vehicles by raising the load floor to a sufficient height to clear all obstructions beneath the load floor. The load floor height can be approximately about four feet. Heavy-duty busses obtain a somewhat lower flat floor area in the forward part of the bus by providing a transversely mounted rear engine that drives rear wheels. The complexities of such a drive make it expensive. As to smaller vehicles, such as medium duty trucks and busses, it is desirable to have a low load floor, as well as a flat load floor. A low step height into the vehicle makes the vehicle much more accessible for loading both passengers and cargo. However, in smaller vehicles, including medium duty busses and trucks, a rear engine/rear drive power package is not a commercially viable option.

It is well known that one can obtain a low flat load floor in a vehicle by disposing the vehicle engine and power train wholly in the front of the vehicle. Such vehicles are already commercially available. Such a vehicle can provide a low step height to the load floor that makes the vehicle much more accessible for loading both passengers and cargo. However, the utility of such vehicles is limited because the driving wheels are not located under the part of the vehicle carrying the load. Improved weight balance and load-carrying capacity is achieved if the engine is in the front of the vehicle and the driving wheels are in the back of the vehicle, under the load.

Because of low load floor front drive trucks and busses have practical limitations, there is still interest in finding an economical rear drive truck and bus that has a low load floor. In addition, disposing the vehicle engine in the front of the vehicle leaves the back of the vehicle more available for passengers and/or cargo. Further, it should be understood that extensive worldwide manufacture and sales of front-engine/rear drive trucks and buses has provided a vast engineering and use experience with front engine/rear drive power trains. This vast experience has provided lowest cost and highest durability for such power trains. For these and other reasons, there is continued manufacture and use of front-engine/rear drive trucks and buses, even though their load floors are relatively high. Because of this extensive production and use experience, there continues to be interest in utilizing front engine/rear drive power trains for low profile and/or low load floor vehicles. However, until my design innovation, no commercially practical design for such a vehicle has been discovered.

It would be of considerable commercial advantage if a low and flat load floor vehicle could be made using mostly traditional front engine/rear drive components. If so, the traditional components would be useful in the manufacture of both the traditional and the low profile vehicles. It would be of even greater advantage if the low load floor vehicle and the traditional vehicle were generally the same forward of the load floor. This will tend to reduce development costs of the low profile vehicle, and make it manufacturable at lower cost and higher durability. I have discovered how to attain this goal. My discovery is particularly of interest to medium duty trucks and busses, where rear drive is quite important.

SUMMARY

It is an object of the present invention to provide a low load floor vehicle having a front engine and a rear drive.

It is another object of the invention to provide an improved power train that enables lower cost manufacture of a low profile vehicle having a rear drive.

It is a further object of this invention to provide a step-down transfer case for transmitting front engine power to rear wheels.

One aspect of the present invention contemplates a vehicle having a conventional in-line front engine, a conventional transmission, a step down power transfer case on the rear of the transmission, and a conventional drive shaft extending towards the vehicle rear. The drive shaft extends to a frame-mounted differential that has opposed half-shaft axles, sometimes referred to simply as half-shafts, extending to rear wheels on opposite sides of the vehicle. The step down transfer case is belt, chain or gear driven and differs from a four-wheel drive transfer case in providing a rear output at a level closer to the roadway 35. The drive shaft can now even be lower in the front than the rear, and preferably is not segmented. The lowered rear output of the step down transfer case and a fixed location of the differential allows the load floor of the vehicle to be very low and flat between the step down transfer case and the differential. If the load floor is very low, there may have to be a step up in the load floor at the differential area to accommodate the differential and the suspension system. However, it can still be flat from the step all the way to the rear.

Lowest load floors are attained by also using a low profile rear suspension system, but especially by also using geared wheel drives on the out board ends of the half-shaft axles. The geared wheel drives split the final drive ratio with the differential, to allow use of a smaller diameter ring gear in the differential. The result is that the differential is smaller, which allows a lower load floor over the differential.

Low load floors all the way to the back of the vehicle can be achieved. However, in many instances a small step up in the differential area may be desired for disposition of non-power train components and accessories under the load floor. A small step up may also be desired if there is rear overhang of the load floor. An appropriate step up supplies rear ground clearance, to enable the vehicle to enter inclines without having its rear strike the roadway.

In a special embodiment of the present invention, a special low profile trailing arm suspension system is used for the rear wheels that allows use of air springs. The air springs can be deflated when the vehicle is parked, to lower rear load floor height. Hence, the rear of the vehicle is made more accessible. It is currently preferred to interpose my step down transfer case as an adapter module between a conventional manual or automatic transmission and a drive shaft. However, it is recognized that in due course, it may be desirable to integrate the step down feature of my transfer case with the transmission.

In yet other aspects of the present invention, if excessively long, the drive shaft might be supported with an intermediate bearing block. While not preferred, the drive shaft could be segmented by an intermediate universal joint.

BRIEF DESCRIPTION OF THE DRAWINGS

Further objects, features and advantages of the present invention will become apparent from analysis of the following written specification, the accompanying drawings, and the appended claims in which:

DETAILED DESCRIPTION

Figure 1:
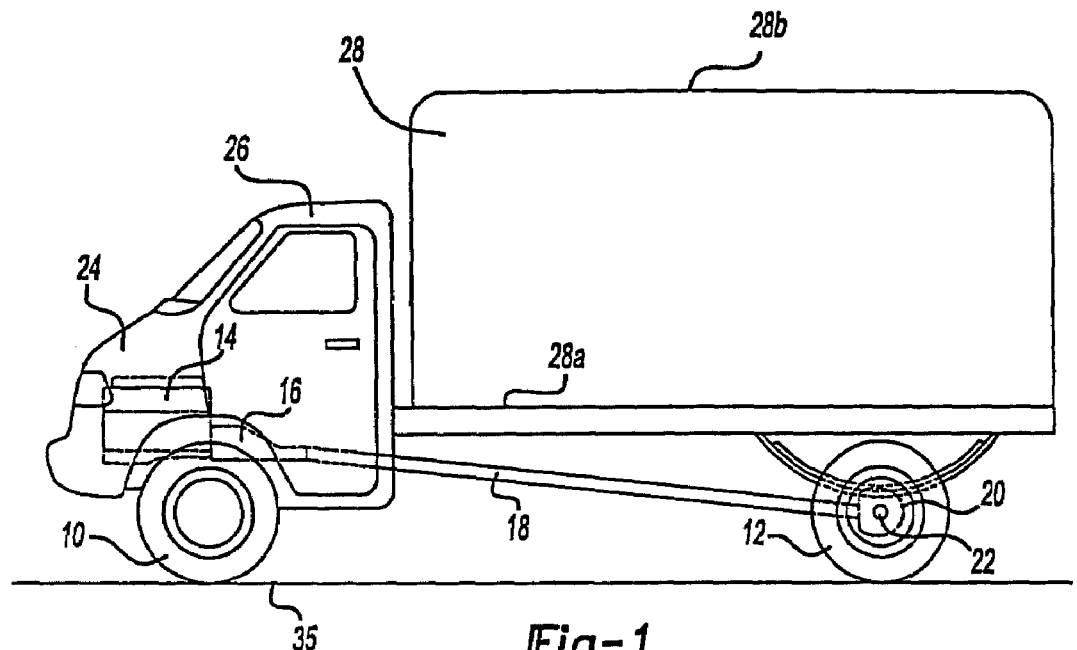
FIG. 1 is a schematic side view of a prior art conventional front engine/rear drive medium duty truck or bus.

Referring to the drawings wherein like characters represent the same or corresponding components, FIG. 1 shows a conventionally powered vehicle such as a truck or bus. If a truck, it is preferably a medium duty truck, which has gross vehicle weights of about 11,000 lb. to 33,000 lb. If it is a bus, it is small to mid-sized bus, as for example a bus having an overall length of about 15 feet up to about 30 feet. By the expression medium duty truck/bus, I mean to include such busses, as well as such a medium duty truck. The prior art truck/bus of FIG. 1 has front wheels 10 and rear wheels 12 that support the vehicle on a roadway 35. Rear wheels 12 are conventionally powered by an internal combustion engine 14, acting through a transmission 16, a drive shaft 18, a differential 20, and axles 22 (only one of which is shown in FIG. 1). The typical truck/bus has an engine compartment 24, a driver's cab 26, and a load-carrying compartment 28. Compartment 28 has a flat load floor 28a that is disposed in a plane not only above differential 20 but also even above the forward end of the drive shaft 18. FIG. 1 shows drive shaft 18 as a single segment. In some other prior art truck/bus vehicles, load floor 28a may be lowered somewhat by using a segmented drive shaft that has an intermediate universal joint. However, using the intermediate universal joint adds cost and another failure site to the vehicle. It is generally accepted that for greatest durability, a single segment drive shaft is preferred. Many embodiments of my invention allow use of a single segment drive shaft, even though the embodiments are vehicles with low load floors.

Figure 8:
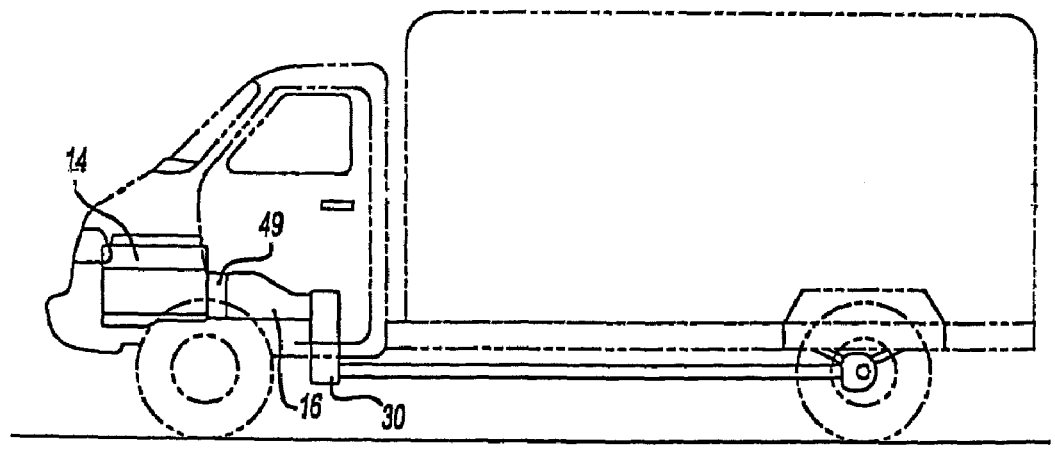
FIG. 8 is a schematic side view of an alternative embodiment of the FIG. 2 truck/bus in which a torque converter is interposed between the in-line front engine and transmission.
Figure 12:
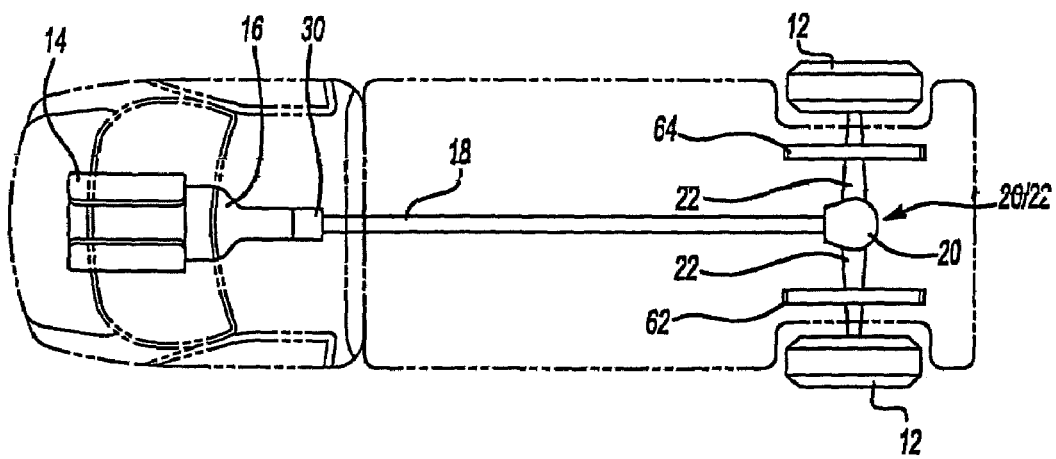
FIG. 12 is a schematic top view of the power train of the truck/bus shown in FIG. 11, with leaf springs shown and other vehicle parts shown in phantom lines for points of reference.

In the prior art typical truck/bus, the internal combustion engine 14 is conventionally longitudinally mounted in an engine compartment 24 forward of the driver's cab 26 of the truck/bus. By longitudinally mounted, I mean that the length of the engine, i.e., the rotation axis of its crankshaft, is in-line with the length of the vehicle, instead of being transverse to the length of the vehicle. Transmission 16 is disposed at the rear of engine 14. It can be directly attached to engine 14 as shown, or to a torque converter that is directly attached to engine 14, as is seen in FIG. 8. Power output from engine 14 is thus input directly or indirectly into transmission 16. The forward end of a drive shaft 18 is connected, usually by means of a universal joint (not shown), to the rear power output of transmission 16. The rearward end of drive shaft 18 is in turn connected to differential 20, usually by means of a universal joint (not shown). Opposed axles 22, only one of which can be seen in FIG. 1, extend outwardly from differential 20 to the rear wheels 12, only one of which can be seen in FIG. 1. Typically, axles 22 are respectively housed in opposed torque tubes (not shown) extending out from opposed sides of differential 20. The torque tubes are rigidly affixed to the opposed sides of differential 20, as shown in FIG. 12. Axles 22 are thus rigidly supported so that they rotate in a fixed position with respect to differential 20. For ease of illustration, the torque tubes are not shown in FIG. 1. However, it should be understood that in this type of prior art rear drive, differential 20 and axles 22 ordinarily form a rigid unitary assembly that is spaced from the vehicle load floor 28a or from the vehicle frame (not shown) by a suspension system. In the following discussion the rigidly supported axles 22 and their covering torque tubes are referred to as axles interchangeably. The suspension system is supported by the rigid differential/axle assembly, and in turn resiliently supports the load floor or frame of the vehicle.

The vehicle of FIG. 1 usually carries its load relatively high up on the vehicle, especially if it is desired to have a flat load floor 28a. When flat load floors are desired, the power train alone can make the vehicle have a high load floor 28a. Rear suspension systems can contribute to load floor height too. In medium trucks, load floor height can be four to five feet high. In typical school buses, load floor height is over three feet high. In smaller mid sized busses and delivery trucks, as for example local area busses used at airports and express package delivery trucks, load floor height is often three significant steps high, which is often about 32-40 inches high. Such a height is clearly undesirable. For example, it precludes ready access by passengers, especially elderly or disabled passengers. It makes loading heavy personal items, such as luggage, difficult and slow. It slows loading and unloading of delivery packages by delivery personnel, etc. It should also be mentioned that it is fatiguing to a delivery person to repeatedly ascend and descend the vehicle steps numerous times per day. This can not only slow other aspects of delivery times but can lead to work related injuries for delivery personnel. Also, in package delivery vehicles, a significant inside height is desired for load compartment 28. If load floor 28a is high, this dictates that the top 28b of compartment 28 be correspondingly high. This height can easily make the delivery vehicle too tall to enter a commercial building's underground garage, where there is ready access to building elevators. Lack of such ready access to delivery sites can further slow average delivery time, increase delivery fatigue, and unnecessarily subject delivery personnel and the packages they carry to undesirable weather conditions. In addition, a tall vehicle has a larger frontal area, which can increase operating costs by reducing vehicle fuel mileage.

Figure 2:
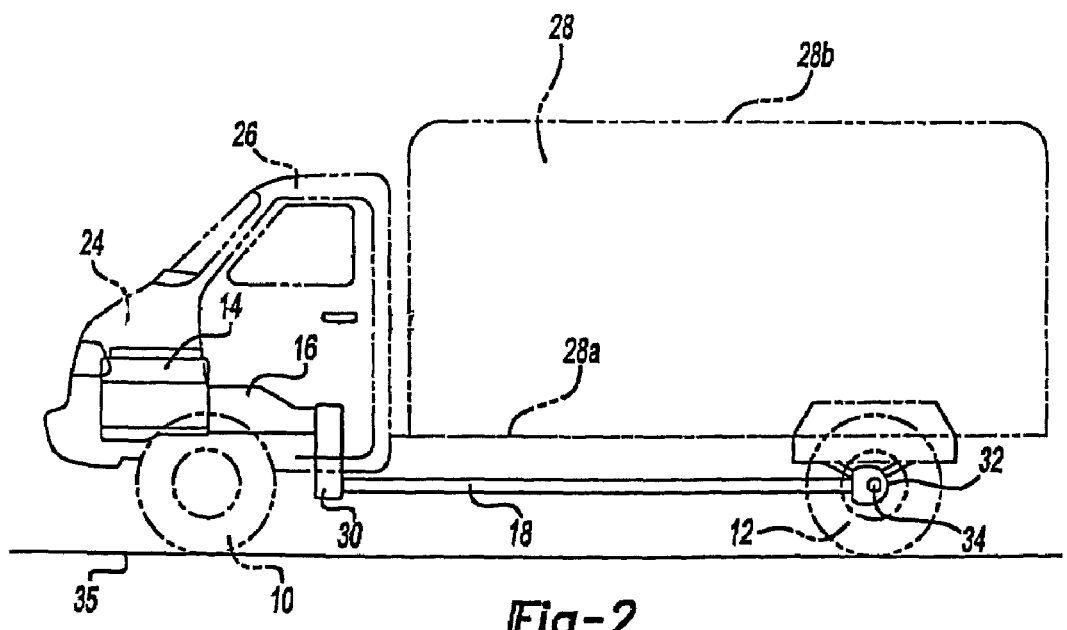
FIG. 2 is a schematic side view of the FIG. 1 medium duty truck/bus modified to include a step-down power transfer case of this invention, a fixed mount half-shaft differential, and a lowered load floor.

An initial embodiment of my improved vehicle is shown in FIG. 2 as a medium duty truck/bus. This initial embodiment of the invention is easily distinguished from the prior art typical medium duty truck/bus of FIG. 1 by its lower load floor 28a, which allows top 28b on load compartment 28 to be lower. Lower top 28b gives the vehicle a lower profile overall. The lower load floor 28a has fewer steps (not shown) up to the load floor 28a. In its most preferred embodiment, shown in FIGS. 11-12 and 15-16, my medium duty truck/bus can have a load floor 28a as low as only 16-18 inches above the road surface (not shown) under wheels 10 and 12. At least one step up to the load floor 28a is eliminated. In my preferred embodiment, two steps are eliminated. As indicated above, fewer steps up to the load floor benefits deliveries and delivery personnel for trucks, and passengers for busses. Also as indicated above, the lower vehicle profile permits access to more underground garages and can enhance vehicle gas mileage. In the city, busses often pick up passengers from a curb. Curbs are typically about six inches high. I contemplate that a forward section of a city bus can be configured to have a load floor of only about 12 inches above the roadway, so that the step up from the curb would be only about six inches or less. This permits the city bus to use a simple, inexpensive, quick acting and durable ramp to load disabled passengers, instead of an expensive, non-durable, and slow acting complex lift system. Such a ramp can also be a significant aid to airport bus passengers burdened with heavy luggage.

As indicated above, FIG. 2 shows a vehicle that can be either a truck or a bus like the vehicle of FIG. 1. If a truck, it is preferably a medium duty truck, which involves gross vehicle weights of about 11,000 lbs. to 33,000 lbs. If it is a bus, it is a small to mid-sized bus, as for example a bus having an overall length of about 15 feet up to about 30 feet. As indicated above, by the expression medium duty truck/bus, I mean to include such busses, as well as such medium duty trucks. Like the truck/bus of FIG. 1, the truck/bus of FIG. 2 has front wheels 10 and rear wheels 12. Rear wheels 12 are powered by an internal combustion engine 14, acting through a transmission 16, a step-down power transfer case 30, a drive shaft 18, a half-shaft differential 32, and swing axles 34 (only one of which is shown in FIG. 2). Engine 14 is longitudinally mounted in an engine compartment 24 in the front of the vehicle. Behind the engine compartment is a driver's cab 26, followed by a load-carrying compartment 28. As in the FIG. 1 prior art truck/bus, engine 14 is conventionally longitudinally mounted, with transmission 16 disposed at the rear of engine 14. Also as in the FIG. 1 prior art truck/bus, transmission 16 can be directly attached to engine 14 as shown, or to a torque converter that is directly attached to the rear of engine 14. Power from engine 14 is thus input directly or indirectly into transmission 16.

Figure 3:
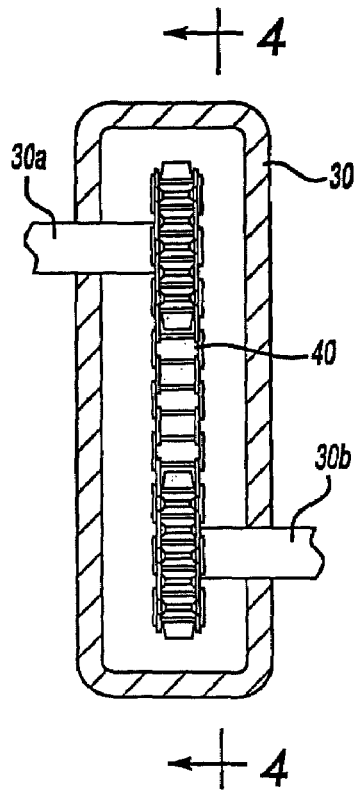
FIG. 3 is an elevational enlarged sectional side view of the step down transfer case included in the truck shown in FIG. 2.
Figure 4:
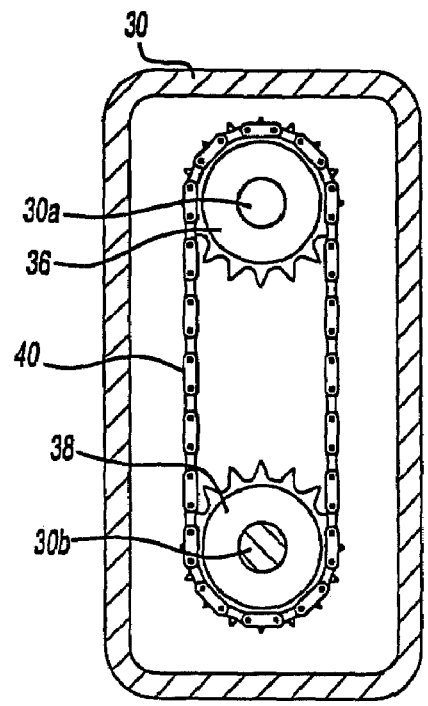
FIG. 4 is a cross-sectional view taken along the line 4-4 of FIG. 3 showing a chain drive internal power transfer connection between the transfer case input and output shafts.

Referring now to FIGS. 3 and 4 as well as to FIG. 2, the step-down power transfer case 30 has a power input shaft 30a on its forward face and a power output shaft 30b on its rearward face. Power input shaft 30a is at or near the top of the front face of transfer case 30. Power output shaft 30b is at or near the bottom of the rear face of transfer case 30. Hence, I refer to transfer case 30 as a step-down transfer case. Power input shaft 30a is connected to the rear power output of transmission 16. Power output shaft 30b is connected to the forward end of drive shaft 18, usually by means of a universal joint (not shown). It can be seen that this point of connection is much lower on the vehicle than the point of connection between drive shaft 18 and transmission 16 in the conventional prior art truck/bus of FIG. 1.

The rearward end of drive shaft 18 is in turn connected to differential unit 32 by a universal joint, as in the prior art vehicle of FIG. 1. However, in this preferred embodiment, differential 32 differs from the differential 20 typically used in the prior art truck/bus shown in FIG. 1. In FIG. 2, differential 32 is a half-shaft differential that is directly affixed to load floor 28a or to the truck/bus frame (not shown). Thus, unlike differential 20 of FIG. 1, differential 32 is not spaced from the load floor 28a or the vehicle frame by a rear wheel suspension system. By half-shaft differential 32, I mean any differential that has axles connected to it in a manner that allows the outer ends of the axles to move up and down without the differential also moving up and down. The connection is typically by a universal joint. Accordingly, a further difference in the FIG. 2 vehicle from the FIG. 1 vehicle is that the FIG. 2 vehicle has opposed swing axles 34 (only one of which is shown in FIG. 2). By swing axles, I mean an axle that is connected to the differential by a movable joint, as for example a universal joint. Swing axles 34 are not rigidly held in torque tubes that are in turn rigidly affixed to their associated differential. Instead, they are connected at their inboard ends to half-shaft differential 32 by universal joints. Accordingly, the outboard ends of swing axles 34 are free to move up and down with respect to differential 32. Repeating, they are not rigidly connected to differential 32 and do not form a rigid unitary assembly with differential 32.

Axles 22 are rotatably supported near their outboard ends by bearings in housings that support the rear wheel suspension system (not shown). The rear wheel suspension system can be disposed between the outboard axle supports (not shown) and the load floor 28a. A rear wheel 12 is connected to the extreme outboard end of each of axles 34. Axles 34 and differential 32 thus differ from the suspended unitary rigid differential/axle assembly of FIG. 1. Other vehicle configurations are contemplated, which can lower the load floor even more, and are preferred for many applications. Such alternative configurations shall hereinafter be described.

It can be seen in FIG. 2 that my improved vehicle has a load compartment 28 with a flat load floor 28a that is disposed in a plane only slightly above the half-shaft differential 32. However, it is still also above the forward end of the drive shaft 18. Even though the FIG. 2 flat load floor 28a is quite low, drive shaft 18 can still be a single segment drive shaft, which is preferred. Importantly, it should be seen that drive shaft 18 is not directly connected to the rear of transmission 16. Instead, it is connected to a step-down power transfer case 30, that is disposed in the vehicle drive line between transmission 16 and the forward end of drive shaft 18. Step-down power transfer case 30 can be analogous to a four-wheel drive power transfer case, and analogously mounted. On the other hand, step-down power transfer case 30 differs from a four-wheel drive transfer case in that it is a simpler mechanism, and provides a rear power output 30b much closer to the roadway 35. Hence, its power output 30b to rear wheels 12 is in a plane considerably below that of the transmission power output. The reason for this latter difference is that in four-wheel drive power transfer cases, the lowest power output goes forward to the front wheels. For this and still other reasons, the rear power output of the four-wheel drive transfer case is high up on the rear face of the transfer case, often in-line with its power input from transmission 16. In contrast, rear power output 30b of my transfer case 30 can be as low as one desires. If not much ground clearance is needed, rear power output 30b might only be 3-6 inches above road surface 35. In summary, my power transfer case 30 provides a significantly dropped driveline to rear wheels 12. With the dropped driveline, drive shaft 18 often need not be segmented even though load floor 28a is made to be quite low. The fullest effect in lowering the load floor 28a, however, requires some additional modifications to the power train and to the rear suspension that will hereinafter be described.

However, more details of the step-down power transfer case 30 and of some vehicle permutations shall be first described. Reference is now specifically made to FIGS. 3 and 4, which show enlarged sectional views of my step-down power transfer case 30 shown in FIG. 2. Power input shaft 30a extends through the forward wall of case 30. Power output shaft 30b extends through the rearward wall of case 30. Inside case 30, the ends of shafts 30a and 30b respectively carry toothed wheels 36 and 38. An endless chain 40 encircles toothed wheels 36 and 38 to provide a power connection between input and output shafts 30a and 30b inside case 30. In summary, the driving means interconnecting input shaft 30a to output shaft 30b in this embodiment of the invention is a chain drive, formed by toothed wheels 36 and 38 and by chain 40.

Figure 5:
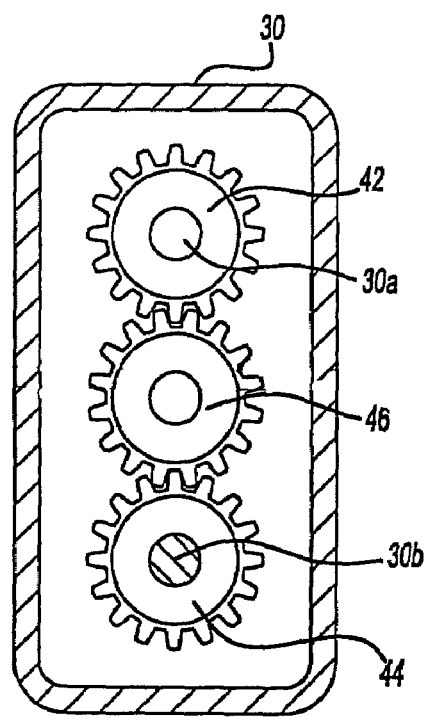
FIG. 5 is a cross-sectional view of a first gear drive alternative embodiment of the internal power transfer connection shown in FIG. 4.
Figure 6:
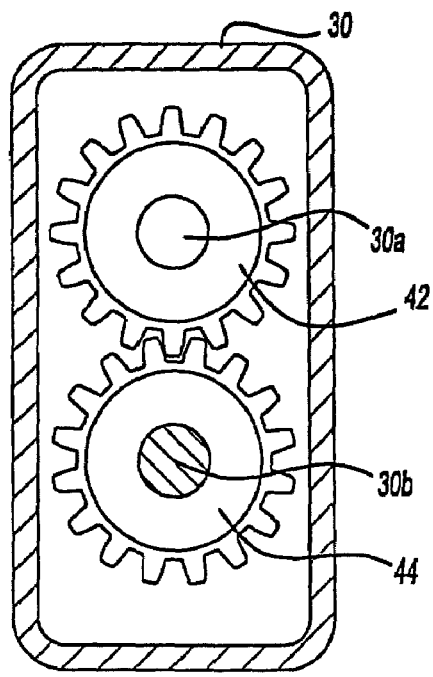
FIG. 6 is a cross-sectional view of a second gear drive alternative embodiment of the internal power transfer connection shown in FIG. 4.

FIGS. 5 and 6 show sectional views analogous to that of FIG. 4 but of alternative embodiments of the chain drive of FIGS. 3-4. In FIG. 5, the toothed wheels 36 and 38 of FIGS. 3-4 are respectively replaced by gears 42 and 44. Gears 42 and 44 mesh with an intermediate gear 46 to obtain a power connection between input shaft 30a and output shaft 30b. Accordingly, it might be said that intermediate gear 46 replaces chain 40 of FIGS. 3-4. In FIG. 6, gears 42 and 44 are shown meshing directly with one another. Such a direct meshing may have the advantage of using bigger gears to vertically space input shaft 30a and output shaft 30b but it reverses rotation of gear 44 from gear 42. This reverses rotation of shaft 30b from shaft 30a. Accordingly, direct meshing of gears 42 and 44 may not be preferred in many cases. Additional intermediate gears (not shown) to intermediate gear 46 might be used to expand the distance between gears 42 and 44. Use of intermediate gears such as intermediate gear 46, and/or sizing the gears can be used to produce any desirable vertical length for case 30, which effectively lowers the output shaft 30b to any desired level. However, in many instances I would probably want fewer gears, not more gears, in order to utilize larger gear teeth so that they can handle more power.

Figure 7:
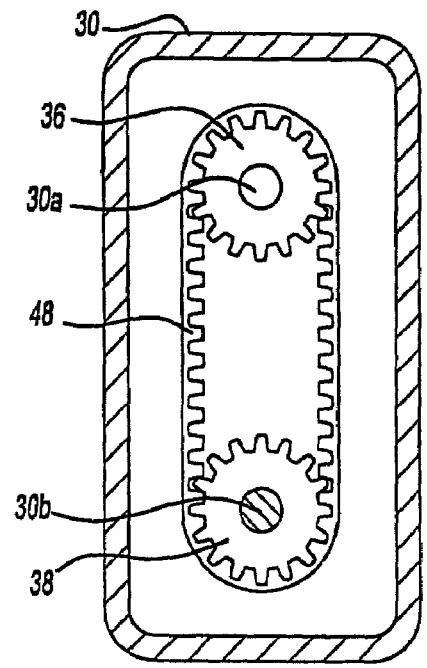
FIG. 7 is a cross-sectional view of a belt drive alternative embodiment of the internal power transfer connection shown in FIG. 4.

FIG. 7 shows a cog belt drive alternative connection between input and output shafts 30a and 30b of case 30. Toothed wheels 36 and 38 of FIGS. 3-4 engage an endless belt 48, instead of chain 40. This alternative would not typically be preferred. It cannot handle as much load as a chain or gear drive. It is only included to illustrate that alternatives to the preferred gear and chain drives are possible.

In FIG. 8, a vehicle is shown that is similar to that FIG. 2. However, FIG. 8 shows that a torque converter 49 can be disposed between engine 14 and transmission 16, and further illustrates the dropped drive line power train of this invention.

As indicated above, one of the very important aspects of this invention is that it uses components that have been commercially available and used for a long time, except for the step down power transfer case 30. In addition, the technology to make my step down power transfer case 30 is readily available. In fact much of the tooling needed to make it is available too, because it is a product analogous to (but different from) a four-wheel drive power transfer case. Accordingly, my power transfer case can be readily made at low cost, and the durability risks over a four-wheel drive power transfer case are not significantly increased. Still further, most of the power train components of my improved vehicle are the same as previously used to make prior art vehicles, and are still being used to make prior art vehicles. Hence, a vehicle manufacturer can use flexible assembly techniques to readily assemble both the prior art type of vehicle and my improved type of vehicle from a substantially common stock of components. In some instances, only my step-down power transfer case and a shorter drive shaft might be needed. In others, the half-shaft differential and swing axles might have to be stocked too. However, half-shaft differentials and swing axles are readily commercially available, and have had a long use and durability experience. They do not require a new inventive design or manufacturing technique that introduces unexpected durability and/or sales risks to the vehicle manufacturer.

Figure 9:
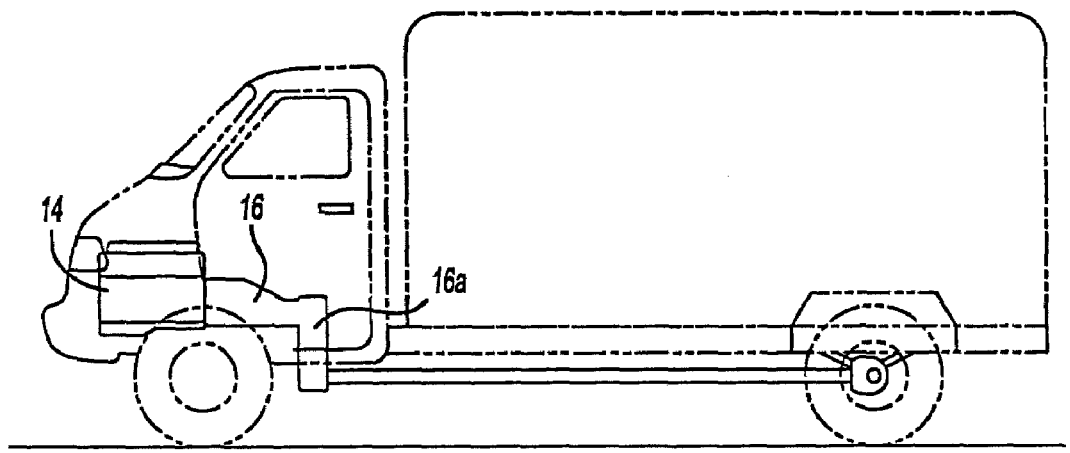
FIG. 9 is a schematic side view of another alternative embodiment of the FIG. 2 truck/bus in which the step-down power transfer case is integrated with the vehicle transmission.

On the other hand, I can contemplate that my invention could eventually be very extensively used. If extensively used by one or more vehicle manufacturers, such use could economically justify redesigning a transmission 16 and/or a torque converter 49 to integrate my step-down power handling invention of case 30. FIG. 9 illustrates such a redesigned transmission 16 in which the rear part 16a of transmission 16 includes an integral step-down power handling portion that is functionally equivalent to my step down power transfer case 30. In such instance a separate step-down case 30 would not be needed.

Figure 10:
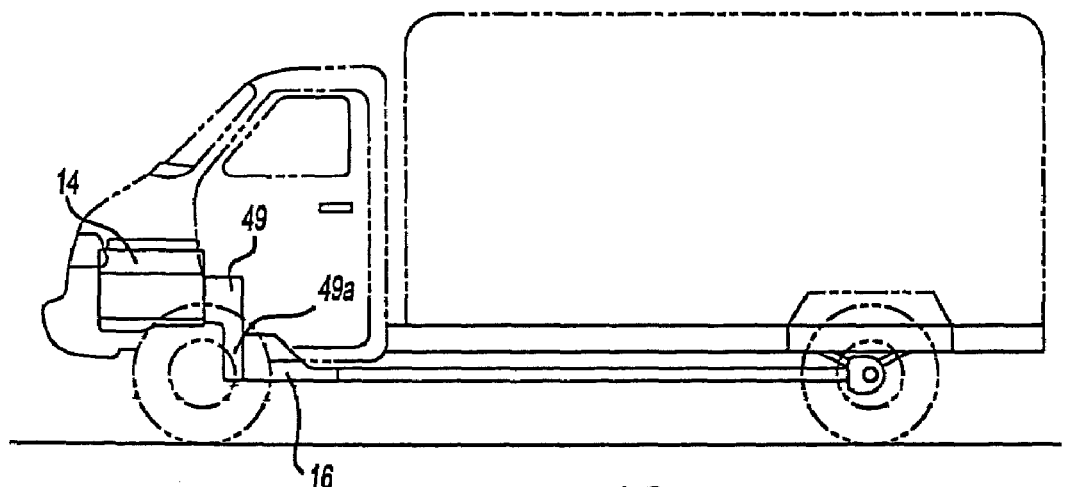
FIG. 10 is a schematic side view of still another alternative embodiment of the FIG. 2 truck/bus in which the step down power transfer case is integrated with a torque converter.

FIG. 10 illustrates that in some instances, the power step-down function of my transfer case 30 might alternatively be integrated into the back end 49a of a torque converter 49 disposed between engine 14 and transmission 16.

Figure 11:
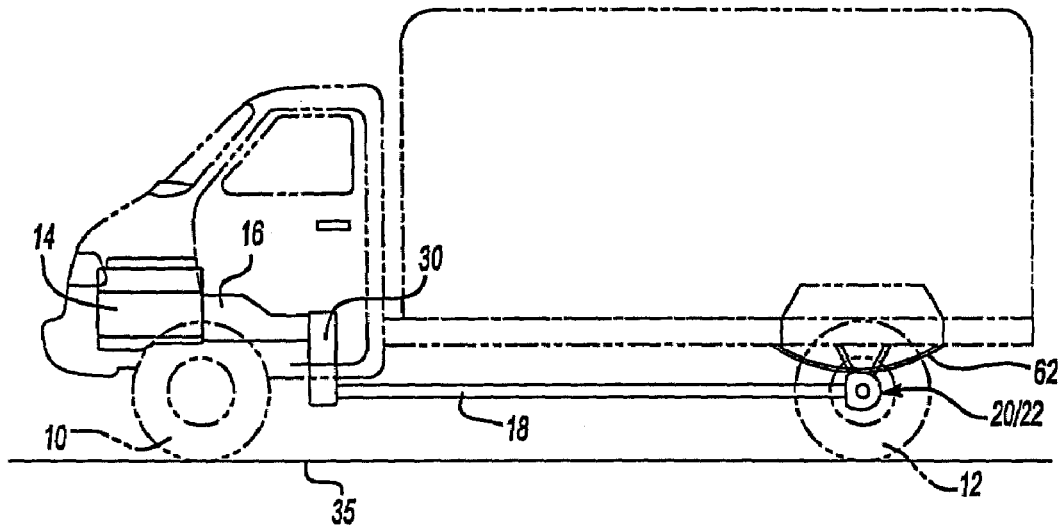
FIG. 11 is a schematic side view of somewhat higher load floor alternative embodiment of the FIG. 2 truck/bus in which the vehicle combines my step-down power transfer case with a rigid differential/axle unit and longitudinal leaf springs.

It is to be appreciated that if an especially low load floor is desired, a low profile rear drive and or rear suspension system must be used with the step-down power transfer described above. However, not all vehicles will demand the lowest load floor. I can contemplate instances where only a moderate lowering of the load floor is needed. For example, the vehicle manufacturer might think that there was a market for an only moderately lowered load floor vehicle because such a vehicle could be manufactured and sold at lower cost than a vehicle with a fully lowered load floor. This might be especially true if that manufacturer were also concurrently manufacturing a FIG. 1 prior art vehicle. In such instance, the manufacturer might want to take economic advantage of using the usual unitary rigid differential/axle assembly and ordinary leaf springs, instead of taking technical advantage of a more expensive low profile rear drive and/or rear suspension. If so, the vehicle manufacturer might choose to use only my step-down power transfer feature. FIGS. 11 and 12 illustrate such a vehicle. FIGS. 11 and 12 show a truck bus that is a combination of the prior art truck/bus shown in FIG. 1 and my improved truck/bus shown in FIG. 2. Like FIG. 2, the FIGS. 11-12 truck/bus has an in-line front engine 14 and transmission 16 providing power to my step-down power transfer case 30, which outputs power to drive shaft 18. However drive shaft 18 connects to a conventional rigid differential/axle unit 20/22, such as contemplated in the prior art truck/bus of FIG. 1. In addition, the rear suspension system is an ordinary leaf spring suspension system, such as contemplated in the prior art truck/bus of FIG. 1. In such a suspension system, a pair of longitudinally oriented leaf springs 62 and 64 is respectively affixed to opposed axles 22 of the rigid differential/axle unit. Leaf springs 62 and 64 are flexibly attached to the vehicle frame or load floor in a usual manner.

Figure 13:
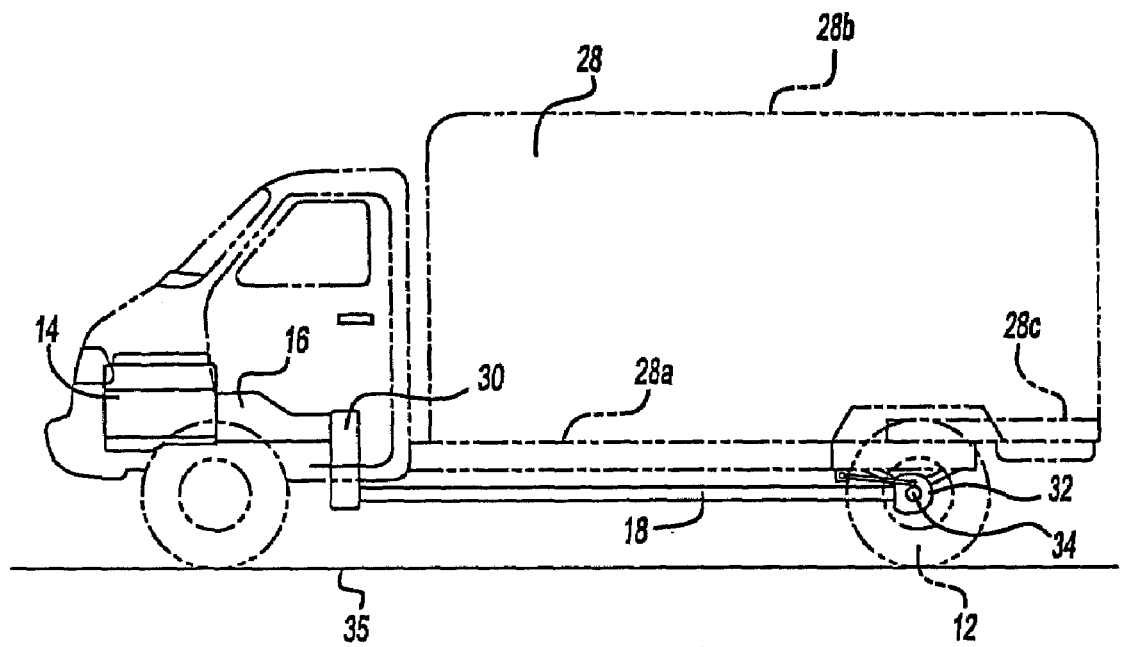
FIG. 13 is a schematic side view of a lower load floor embodiment of this invention that includes a low profile torsion bar trailing arm rear suspension in addition to a power train having a half-shaft differential and swing axles that directly drive rear wheels.
Figure 14:
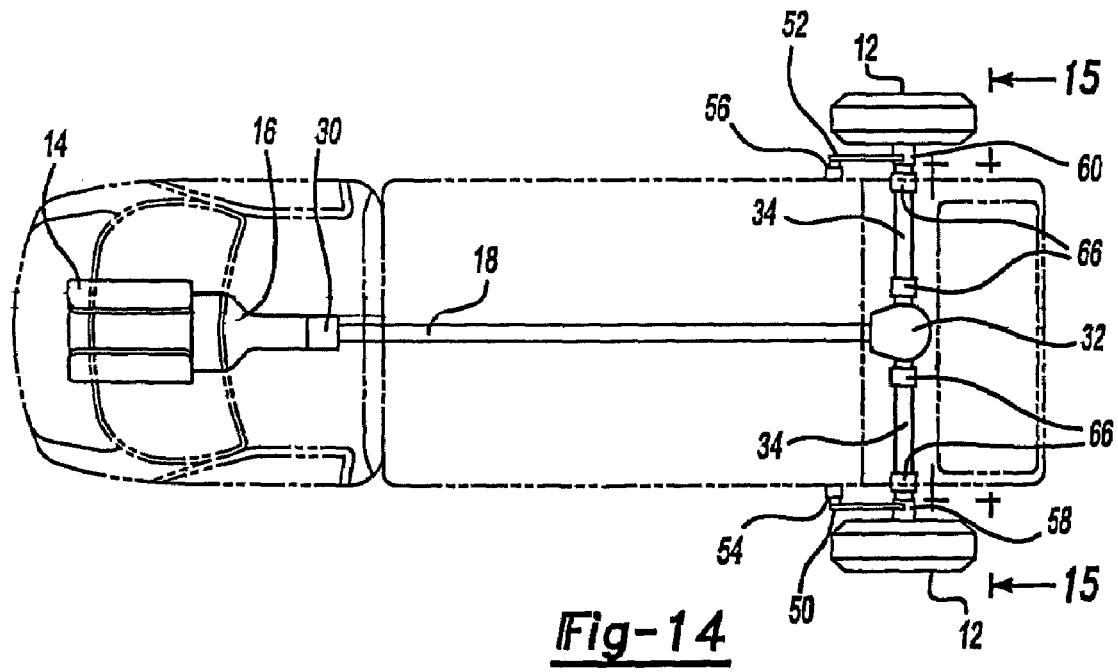
FIG. 14 is a schematic top view of the power train of the truck/bus shown in FIG. 13, with suspension trailing arms shown and other vehicle parts shown in phantom lines for points of reference.
Figure 15:
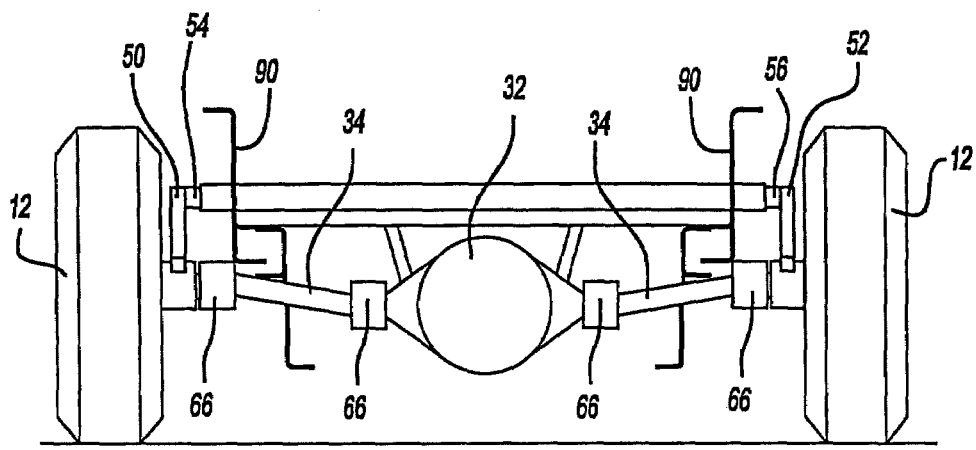
FIG. 15 is an enlarged schematic rear end view along the line 15-15 of FIG. 14.
Figure 16:
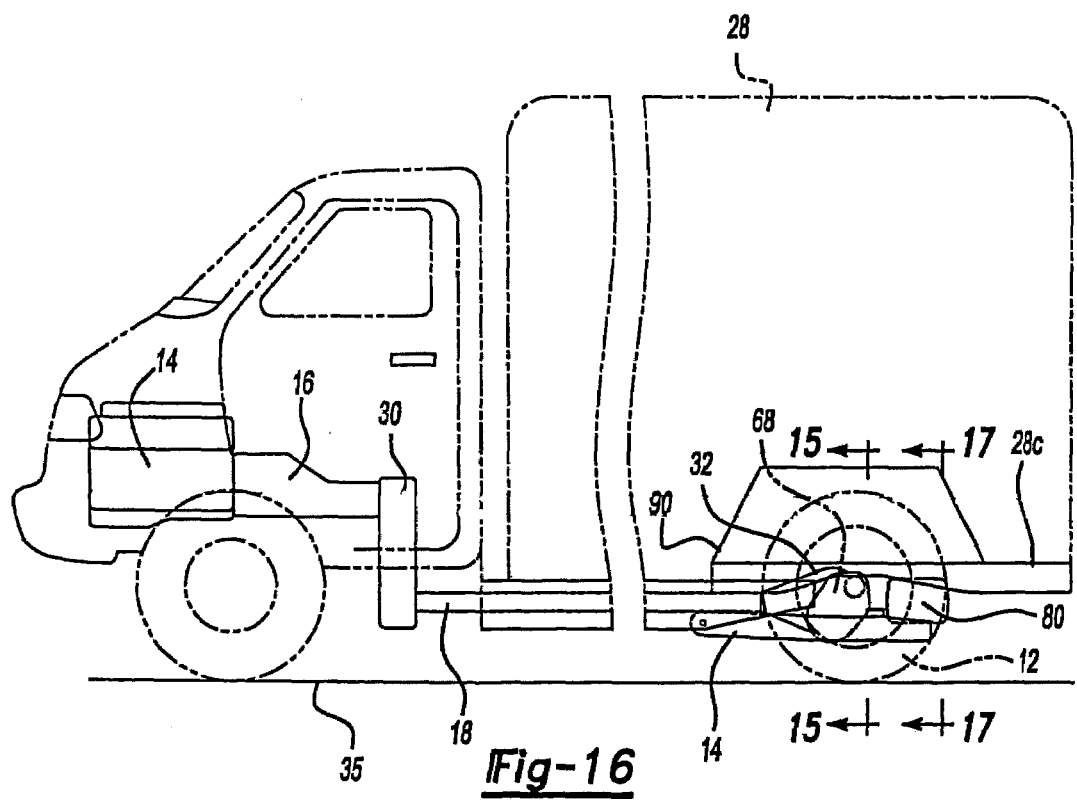
FIG. 16 is a schematic side view of the lowest load floor vehicle example described herein, and shows a vehicle having my step-down power transfer case, a low profile half-shaft differential, gear drives at axle outer ends, and a specially low profile trailing arm rear suspension.
Figure 17:
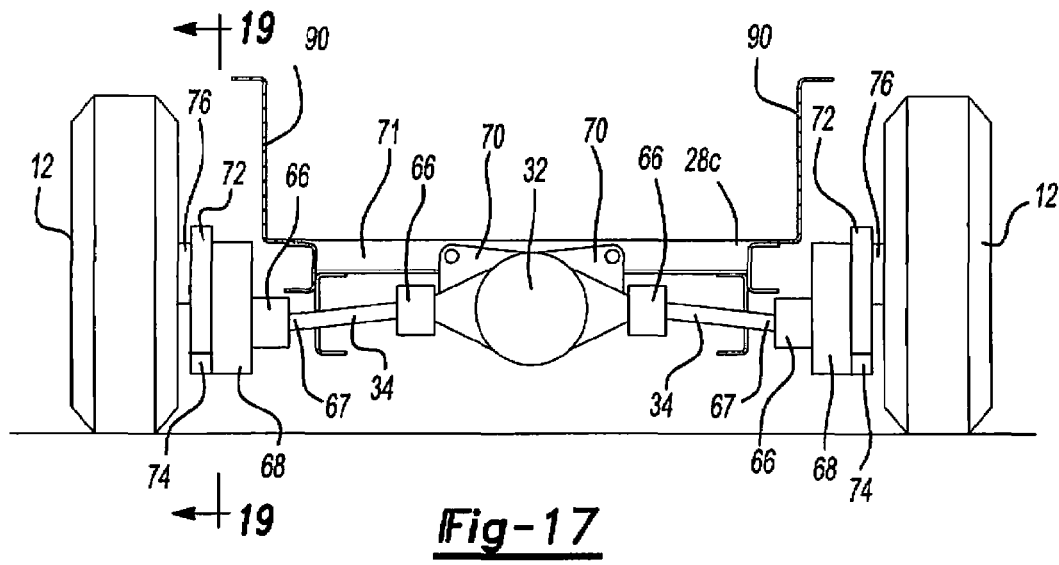
FIG. 17 is a schematic end view along the line 17-17 of FIG. 16.
Figure 18:
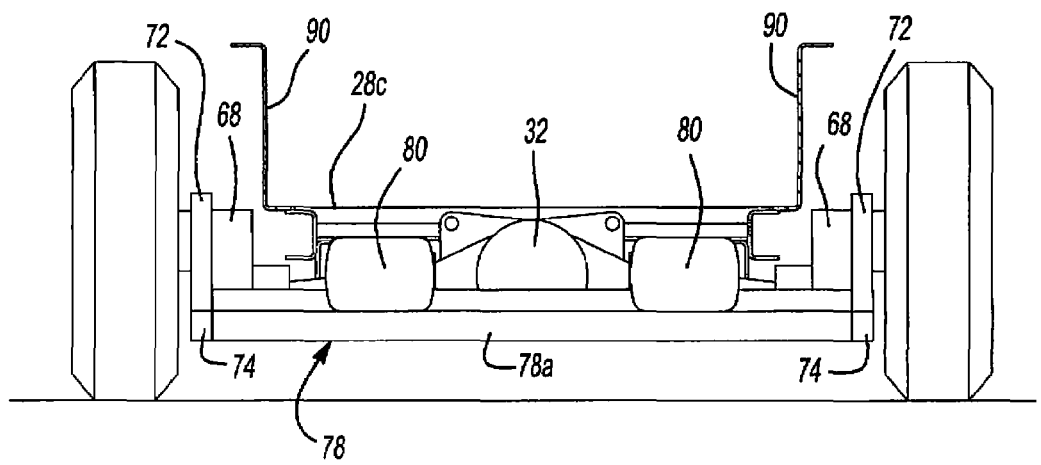
FIG. 18 is a schematic end view along the line 18-18 of FIG. 16.

FIGS. 13-15 illustrate a lower profile embodiment of my vehicle than shown in FIGS. 11-12. FIGS. 13-15 show a vehicle that includes a very simple form of a low profile rear suspension system in addition to a power train that has a half-shaft differential and swing axles. In FIGS. 13-15, the vehicle has a longitudinally mounted engine 14 and transmission 16, my power transfer case 30, drive shaft 18, a half-shaft differential 32, and swing axles 34. Swing axles 34 each have a constant velocity universal joint 66 at their inner and outer ends. The rear suspension includes trailing arms 50 and 52 that are respectively affixed to the outer ends of torque rods 54 and 56 transversely mounted on the vehicle frame or load floor. As torque rods 54 and 56 twist, trailing arms 50 and 52 rotate about the twist axis of the torque rods. This provides resilient support for the trailing arms 50 and 52. Trailing arms 50 and 52 in turn support axles 58 and 60, on which rear wheels 12 are rotatably mounted. Trailing arms 50 and 52 can be at affixed at any angle theta on the ends of torque rods 54 and 56. Axles 58 and 60 can be at any location on, above, or below the trailing arms. If the axles are to be located above or below trailing arms 50 and 52, plates would be respectively welded above or below the control arms 50 and 52, to support the axles 58 and 60. Thus one can adjust the location of axles 58 and 60 to be in any desired plane with respect to the plane of load floor 28a, and at any distance from the trailing arm pivot point on the torque rods 54 and 56. In this manner, load floor 28a can be at any desired nominal height above roadway 35, and ride softness or load capacity can be at any desired level. Axles 58 and 60 would most likely be located at or slightly below the load floor 28a, especially if 16-18 inch diameter rear wheels 12 are used. Referring now specifically to FIG. 15, it should be mentioned that precise support of the plates supporting axles 58 and 60 is not shown. However, it can be seen that differential 32 and universal joints 66 are larger in diameter than in the next embodiment of this invention that shown in the following FIGS. 16-19. The reason for this will be more fully described in connection with the description of FIGS. 16-19. In short, however, the reason is that the ring gear and carrier in differential 32 and the universal joints on axles 34, as well as axles 34 themselves, have to be of large enough diameter to carry the torque loads to the rear wheels. As will also be mentioned, these issues affect frame clearances of the axles and universal joints, and ground clearances of the differential. Both of these factors would raise minimum allowable load floor height, and the attendant overall height of the vehicle if it was desired to have the load floor flat all the way to the back of the vehicle. For example, vehicle loads of about 20,000-30,000 pounds, the ring gear (not shown) in differential 32 would have to be about 13-14 inches in diameter. The case on differential 32 would have to be correspondingly bigger. Perhaps the case on differential 32 might be about 18 inches. If a differential ground clearance of 4 inches is desired when the vehicle is loaded, an unloaded ground clearance of about 6 inches might be required. This might dictate a rear load floor height of about 24 inches in the step up 28c.

On the other hand, in many instances it may be acceptable to have a step up 28c in the load floor 28a over the differential area, and then have the load floor 28c be flat all the way to the back of the vehicle. Such a step up 28c in the load floor 28a is shown in the side view of FIG. 13. Moreover, it may be desirable to have a significant step up 28c in the rear of the vehicle for other reasons, as for example to provide underfloor space between frame members for location of a fuel tank 68 or other vehicle accessories. A step up 28c may be needed in the rear of the vehicle frame merely to provide added ground clearance at the rear of the vehicle. The added ground clearance would be needed if main load floor 28a were particularly low, so that the vehicle can back up without the vehicle frame striking high curbs. It might also be desired to allow the vehicle to enter inclines such as driveways without striking its rear on roadway 35. This is particularly important if the vehicle has a significant overhang behind its rear wheels.

FIGS. 16-19 show the lowest load floor embodiment of a vehicle in this description. The load floor 28a of the vehicle shown in FIGS. 16-19 is so low that a step up 28c in the load floor will probably be required at the rear of the vehicle for the practical reasons outlined in the preceding paragraph. However, in the FIG. 16-19 embodiment of this invention, the step up 28c in the load floor need not be very much if the vehicle has little rear overhang. The reason why the step up 28c can be smaller in this embodiment will become more apparent from the following discussion.

FIGS. 16-19 show a medium duty truck/bus analogous to that shown in FIG. 2. It has an in-line front engine 14 powering a longitudinally mounted transmission 16. Transmission 16 in turn powers a step-down power transfer case 30 that is connected to the front end of drive shaft 18 by a universal joint. The rearward end of drive shaft 18 is connected to a half-shaft differential 32 by means of a universal joint. Half-shaft differential 32 has a three point mounting to the vehicle frame. Two of the mounts are ears 70 on the top main bulb of the half-shaft differential 32 that are bolted to a transverse beam 71 of the vehicle frame. The third mount is an ear (not shown) on the front of the differential that is bolted to another transverse beam of the vehicle frame. Half-shaft differential 32 is connected to inner ends of opposed swing axles 34 by means of universal joints 66. Axles 34 have universal joints 66 at their outer ends 67 that respectively connect the outer ends 67 of axles 34 to input shafts low on the inside faces of step-up gearboxes 68. Step up gearboxes 68 are geared reduction wheel end drives that will hereinafter be described in greater detail. Gearboxes 68 are supported on plates 72 that are carried on a pair of trailing arms 74 of a low profile rear suspension system. The forward ends of the trailing arms 74 are pivotally mounted to the vehicle frame. One trailing arm 74 is mounted on one side of the vehicle and the other trailing arm 74 is mounted on the other side of the vehicle. Each gearbox has an output shaft high up on its outer face that extends through mounting plate 72. The gearbox output shaft forms axle 76, on which rear wheel 12 is mounted. A torque box 78 connects trailing arms 74. This torque box/trailing arm suspension system is described and claimed in U.S. Pat. No. 6,142,496, issued Nov. 7, 2000, which was filed in my name and is entitled "Low Load Floor Trailer and Suspension System", and which is hereby incorporated in this specification by reference. As in my U.S. Pat. No. 6,142,496, torque box 78 is formed by a parallel pair of mutually spaced transverse beam members 78a and 78b that extend from one trailing arm 74 to the other and are rigidly connected to inside faces of the trailing arms 74. The torque box 78 can be reinforced as for example by plates on the upper and/or lower faces of the torque box, and/or with diagonal bracing on those faces. A pair of air bags 80 provides resilience to the suspension system. The air bags 80 are disposed on the upper face of torque box 78 under the load floor 28c of the vehicle, or alternatively under a transverse beam of the vehicle frame. Flexing of the trailing arms 74 squeezes air bags 80 between the torque box 78 and the load floor 28c or the transverse frame beam, to provide resiliency to the suspension.

My U.S. Pat. No. 6,142,496 specifically describes a torque box/trailing arm low profile suspension system for a trailer. The suspension system includes trailing arms, a torque box that includes the trailing arms, air bags between the torque box and the underside of the trailer load floor, and wheel axles mounted on plates extending up from the top surface of the trailing arms. Hence, it is similar to the suspension system described above regarding FIGS. 16-19. However, in my U.S. Pat. No. 6,142,496, incorporated herein by reference, the torque box and air bags are described as being forward of the wheel axles. The embodiment of this invention shown in FIGS. 16-19 differs in that the torque box and air bags are aft of the axles, in order to accommodate differential 32, axles 34, and step-up gearboxes 68. In addition, the axles have geared reduction end drives, in which the output is a step up from the input. This step up allows lower positioning of the differential 32, and/or higher positioning of Wheels with respect to the load floor 28a. As can be specifically seen in FIGS. 16-19, the tops of gearboxes 68 are angled to the vehicle rear. This allows differential 32 to be moved forward, which in turn allows the torque box 78 to be moved forward. As shown, it is moved forward enough to be forward of the rearmost outer profile of rear wheels 12. Accordingly, if the vehicle backs up to a curb, rear wheels 12 will strike the curb, not torque box 78 of the rear suspension system. Thus, the tilt of the gearboxes 68 provides protection of torque box 78 from inadvertent vehicle backup injury. In addition, when tilted as shown, the bottom of gearboxes 68 need not be as close to roadway 35. It should be noted that if air were released from air bags 80, the rear of the vehicle would rest closer to roadway 35. This feature is currently used in heavy-duty busses to lower the step height of the front door. It is sometimes referred to as a "kneeling". In this invention, releasing air from air bags 80 lowers the rear of the vehicle, which can facilitate loading the vehicle from the rear.

Figure 19:
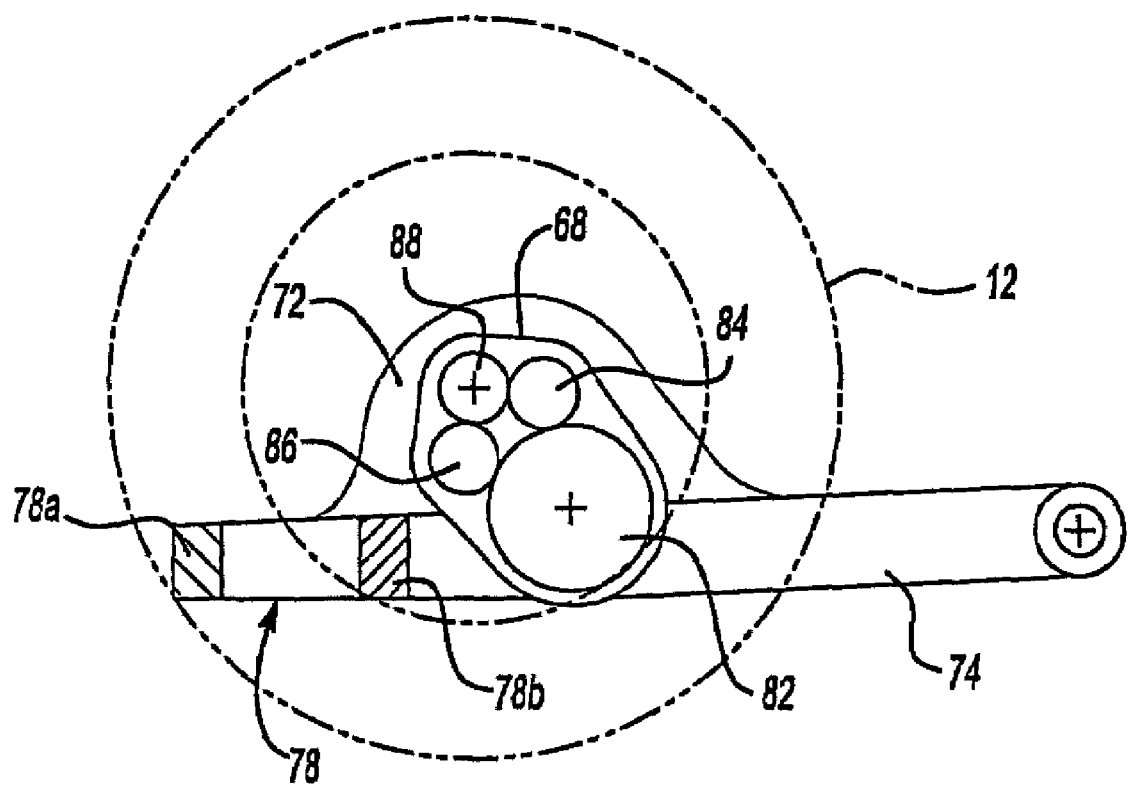
FIG. 19 is a schematic view along the line 19-19 of FIG. 17, showing the interior of the gear drive at wheel end of axle, and the mounting of the gear drive on a vertical plate extending up from the suspension trailing arm.

FIG. 19 is an enlarged schematic view showing the left trailing arm 74 of the suspension system as viewed looking out from between the wheels. On the right side, the view would look the same but in mirror image. FIG. 19 shows step-up gearbox 68 is mounted on a plate 72 supported on trailing arm 74. This view includes a vertical section through the step-up gearbox 68. The vertical section of gear box 68 shows that the input shaft of each gear box 68 has a large gear 82 that drives two smaller gears 84 and 86. Gears 84 and 86 in turn drive a pinion 88, which is on the gear, box output shaft. As indicated above, the gearbox output shaft forms the axle for rear wheel 12. Since pinion 88 meshes with both of gears 84 and 86, tooth loading is split between them. For this reason the small pinion 88 is able to handle the torque required for driveability of a medium duty truck/bus.

The purpose of gearbox 68 is to reduce the torque handled by the differential and by the constant velocity universal joints 66. If the ratio of drive shaft rotation speed to axle rotation speed is high, torque on the ring gear inside differential 32 is high. If this ratio is reduced, the torque forces are reduced. In such instance, differential 32 can have a smaller diameter ring gear and be less massive. For analogous reasons, axles 34 and universal joints 66 can be less massive, and particularly of smaller diameter. This effectively allows lowest load floor designs, because the step up 28c in the rear oaf the vehicle can be made smaller. In other words, incorporation of geared reduction in step-up gearboxes 68 in the drive line aft of the differential, permits torque to be split between the gearboxes and the differential, which permits use of a less massive differential 32, less massive universal joints 66, and less massive axles 34. For comparison with FIGS. 13-15, for carrying 20,000-30,000 pound loads, an 8-9 inch ring gear might be used. This decidedly shrinks the size of differential 32. If less massive universal joints are used, less clearance is needed in the frame to accommodate axle vertical swing during loading and unloading of the vehicle suspension as the vehicle travels down roadway 35. In this latter connection, FIGS. 16-19 show a vertical thinning of the vehicle frame over axles 34 to accommodate such axle vertical swing. FIGS. 16-19 also show a structural inner fender 90 over the thinned area of the frame, which serves as a frame reinforcement. In summary, the less massive axles 34 and universal joints 66 are the less the need for allowing space for their vertical swing. This means that the frame, i.e., the load floor can be lower to the ground and/or the need for frame reinforcement is less. Both contribute to a weight savings, which can reduce manufacturing and operating costs of the vehicle. Since this is unsprung weight, reducing it improves vehicle ride.

In other words, and in greater detail, to obtain the lowest potential load floor 28c over the rear differential the drive reduction to the rear wheels is split between the fixed half-shaft differential unit 32 and the gearboxes 68 at the axle outer ends. The purpose of combining drive reduction between these components offers several advantages. Conventional rear differentials used in vehicles in this weight class provide drive reduction ratios that range from 4.00+ to 1 up to 5.5 to 1 or greater. Differentials and rear axles which have ratios like these require a large ring gear to react the vehicle drive torque. When the drive mechanism splits the ratio in half, with about one half of the drive reduction occurring at the differential unit 32 and the other half occurring at each gearbox 68, differential 32 will be ½ or less of the conventional unit, or 2.0:1 to 2.75:1. The permits use of a smaller diameter ring gear to achieve this ratio without sacrificing driveline durability. Additionally because the remainder of the drive ratio is achieved at the step-up gearboxes at the axle ends, the output shafts of the differential, i.e., axles 34, are required to transmit ½ or less of the wheel drive torque of the vehicle. This further reduces the torque demand of the differential which permits additional down sizing and added durability.

Still more specifically, axles 34 transmit torque to the rear wheels through a geared drive mechanism mounted to, or integral with the wheel end carrier. This geared drive accomplishes additional benefits. First the geared drive allows the axles 34 to be located below the normal wheel center, so that the axles 34 and their universal joints 66 can be more conveniently packaged below the low load floor 28c of the vehicle. Repeating to some extent the comments made above, The indexing of step-up gearboxes 68 permits optimal placement of suspension components under the low load floor. These geared wheel end drives 68 also allow easy ratio changes without requiring tooling of additional differentials. The portion of the final drive ratio provided by these geared drives 68 effectively reduces the torque by an amount equal to the portion of the ratio contained in the geared wheel end drive. For example, a final drive ratio of 5.0:1 achieved by using a 2.5:1 differential in combination with a 2.0:1 geared wheel end drive will be required to transmit only ½ the output shaft, i.e., axle shaft, torque as a final drive system that uses a conventional 5.0:1 differential directly connected to the rear wheel ends, as in FIGS. 13-15. It is thus seen that if differential 32 provides the complete final gearing as in FIGS. 13-15, the load floor at the rear differential would need to be several inches higher than the system which splits the ratio between the differential and geared wheel end drives.

It should be mentioned that the use of gearboxes at rear wheels is not new. Geared reduction wheel end drives are used on Hummer military vehicle. They provide high ground clearance for that vehicle. In this invention, the drive train between the rear wheels 12 might be viewed as the reverse of the driveline in the Hummer vehicle. The gearboxes in this invention allow use of a lower differential and lower the vehicle body with respect to the wheels. Hence, one might view my rear drive line as an upside down version of the Hummer rear drive line. While gearboxes similar to those used in the Hummer vehicle might be used in this invention, one could also use gear boxes that are miniature versions of my step-down power transfer case 30 hereinbefore described.

It should also be mentioned that the Figures of the drawing are not necessarily to scale or correct in relative proportions. They have been prepared for illustration of the points discussed in this specification, not as working drawings. for example, no shock absorbers are shown in the drawings. However, most suspension systems will include them. As further example, in the trailing arm suspension of the FIGS. 13-15 and FIGS. 16-19 embodiments, one end of a shock absorber would be mounted on each trailing arm. The other end of the shock absorber would be attached to an adjacent part of the vehicle frame or reinforced part of the vehicle body. In the FIGS. 16-19 embodiment, the other end of the shock absorber might alternatively be attached to the structural inner fender 90. Such a mount is analogous to the trailer sidewall mount shown in my abovementioned U.S. Pat. No. 6,142,496.

While my invention has been described in the specification and illustrated in the drawings with reference to specific preferred embodiments, it will be understood by those skilled in the art that various changes may be made and equivalents may be substituted for elements thereof without departing from the scope of the invention as defined in the claims. In addition, many modifications may be made to adapt a particular vehicle or component thereof to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the description of the appended claims.

What is claimed:

1. A vehicle, comprising:
   a longitudinally mounted front engine having a power output;
   a load floor that runs from approximately a front of said vehicle to a rear of said vehicle;
   a suspension supporting said load floor on rear wheels;
   a differential unit that drives said wheels and that is driven by said output;
   a single segment drive shaft that transfers drive torque between said output and said differential;
   first and second axles oppositely extending from said differential;
   first and second constant velocity universal joints each connected at an outer end of one of the first and second axles; and
   first and second step up power transfer devices each connected to one of said constant velocity universal joints driven by said differential and operating to drive each of said wheels, said first and second step up power transfer devices each including multiple gears, said gears including:
      a first gear rotated by one of the first and second constant velocity universal joints defining a power transfer device input; and
      a second gear laterally offset with respect to said first gear and rotatably driven by said first gear, said second gear smaller than said first gear and operably connected to rotate one of said wheels, said second gear elevated above said first gear defining a power transfer device output to said wheels elevated with respect to said power transfer device input.

2. The vehicle of claim 1, wherein said power transfer device includes a gearbox angled toward a rear of said vehicle.

3. The vehicle of claim 1, wherein said power transfer device further includes third and fourth gears each smaller than said first gear, each meshed with said first gear and each positioned between said first and second gears and meshed with and operable to rotate said second gear.

4. The vehicle of claim 1, further comprising a drive device connected to said engine and disposed between said engine and said drive shaft, said drive device having an input connected to said engine and an output positioned below said input operable to reduce ground clearance of said drive shaft and said load floor.

* * * * *